(12) United States Patent
Sakai et al.

(10) Patent No.: US 9,611,127 B2
(45) Date of Patent: Apr. 4, 2017

(54) WORKING VEHICLE

(71) Applicant: TADANO LTD., Kagawa (JP)

(72) Inventors: Shingo Sakai, Kagawa (JP); Kensuke Oosawa, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 14/766,652

(22) PCT Filed: Feb. 24, 2014

(86) PCT No.: PCT/JP2014/000955
§ 371 (c)(1),
(2) Date: Aug. 7, 2015

(87) PCT Pub. No.: WO2014/147968
PCT Pub. Date: Sep. 25, 2014

(65) Prior Publication Data
US 2015/0375973 A1 Dec. 31, 2015

(30) Foreign Application Priority Data
Mar. 19, 2013 (JP) ................................ 2013-055899

(51) Int. Cl.
*B60K 11/02* (2006.01)
*B66C 23/62* (2006.01)
(Continued)

(52) U.S. Cl.
CPC .............. *B66C 23/62* (2013.01); *B60K 11/02* (2013.01); *B66C 23/36* (2013.01); *F16H 41/30* (2013.01);
(Continued)

(58) Field of Classification Search
CPC ......... B66C 23/62; B66C 23/36; B60K 11/02; B60K 11/04; F16H 41/30; B60Y 2200/416
(Continued)

(56) References Cited

U.S. PATENT DOCUMENTS

| | | | | |
|---|---|---|---|---|
| 4,316,722 A | * | 2/1982 | Aschauer | B63G 8/10 114/269 |
| 4,325,219 A | * | 4/1982 | Stang | F01P 7/165 60/599 |

(Continued)

FOREIGN PATENT DOCUMENTS

| | | |
|---|---|---|
| JP | H07-110058 A | 4/1995 |
| JP | 2006-037872 A | 2/2006 |

OTHER PUBLICATIONS

International Search Report for PCT/JP2014/000955, Apr. 22, 2014.

*Primary Examiner* — Hau Phan
*Assistant Examiner* — Jacob Meyer

(57) ABSTRACT

Provided is a working vehicle capable of efficiently cooling an engine, a torque converter oil and a hydraulic oil.
There are provided an engine 11, a torque converter 12, a hydraulic working device 15 to be operated by a hydraulic oil 31, a radiator 16 for radiating heat of engine cooling water 32 for cooling the engine 11, an oil cooler 17 for radiating heat of the hydraulic oil 31, and a heat exchanger 19 for performing a heat exchange between a torque converter oil 33 to be used for the torque converter 12 and the hydraulic oil 31. The torque converter oil 33 is heat exchanged with the hydraulic oil 31. Therefore, heat of the torque converter oil 33 is radiated by the oil cooler 17 through the hydraulic oil 31. Also in a running operation, the heat can be radiated by both of the radiator 16 and the oil
(Continued)

cooler 17, and the engine 11, the torque converter oil 33 and the hydraulic oil 31 can be cooled efficiently.

2 Claims, 3 Drawing Sheets

(51) Int. Cl.
 *F16H 41/30* (2006.01)
 *B66C 23/36* (2006.01)
 *B60K 11/04* (2006.01)

(52) U.S. Cl.
 CPC ......... *B60K 11/04* (2013.01); *B60Y 2200/416* (2013.01)

(58) Field of Classification Search
 USPC .................................. 180/68.4, 306, 307
 See application file for complete search history.

(56) References Cited

U.S. PATENT DOCUMENTS

| | | | | |
|---|---|---|---|---|
| 4,362,131 A * | 12/1982 | Mason | ...................... | F01P 3/20 123/41.1 |
| 4,535,729 A * | 8/1985 | Faylor | ...................... | F01P 3/20 123/41.1 |
| 4,545,334 A * | 10/1985 | Nakagawa | ............... | F01P 11/08 123/196 AB |
| 4,680,928 A * | 7/1987 | Nishikawa | ............ | F15B 21/042 192/3.28 |
| 6,354,089 B1 * | 3/2002 | Lech | ........................ | E02F 9/00 62/50.2 |
| 6,511,396 B1 * | 1/2003 | Tanizawa | .................. | F01P 3/20 123/41.31 |
| 6,536,381 B2 * | 3/2003 | Langervik | ................ | F01P 3/20 123/196 AB |
| 6,758,266 B1 * | 7/2004 | Sjunnesson | ............. | B60R 17/02 123/41.33 |
| 7,261,068 B1 * | 8/2007 | Wantschik | .............. | F01P 7/165 123/41.29 |
| 7,699,028 B2 * | 4/2010 | Guerrero | .............. | B60H 1/3227 123/41.29 |
| 9,255,386 B2 * | 2/2016 | Kikuchi | ................ | E02F 9/0866 |
| 2003/0094325 A1 * | 5/2003 | Coutant | ................ | B60K 11/02 180/233 |
| 2007/0089874 A1 * | 4/2007 | Tuntland | ............... | F28F 9/0234 165/280 |
| 2007/0095504 A1 * | 5/2007 | Tuntland | ........... | B60H 1/00328 165/41 |
| 2007/0101708 A1 * | 5/2007 | Ohigashi | ............... | E02F 9/2235 60/431 |
| 2009/0090525 A1 * | 4/2009 | Juvonen | ................ | B25D 9/145 173/1 |
| 2009/0272441 A1 * | 11/2009 | Sasaki | ....................... | F01P 7/16 137/468 |
| 2010/0064991 A1 * | 3/2010 | Mizoguchi | ................ | B60T 5/00 123/41.12 |
| 2012/0241235 A1 * | 9/2012 | Shintani | ................ | E02F 9/2095 180/68.1 |
| 2013/0092366 A1 * | 4/2013 | Hyodo | .................... | E02F 9/226 165/287 |
| 2013/0217539 A1 * | 8/2013 | Natsume | .................. | B60K 6/48 477/52 |

\* cited by examiner

PRIOR ART

WORKING VEHICLE

TECHNICAL FIELD

The present invention relates to a working vehicle. More specifically, the present invention relates to a working vehicle capable of carrying out a running operation through a running vehicle body and a work through a hydraulic working device.

BACKGROUND ART

As shown in FIG. 3, a working vehicle 101 such as a mobile crane is provided with an engine 111, and power of the engine 111 is transmitted to a wheel 102 through a torque converter 112, a transmission 113 and the like so that a running operation is enabled by a running vehicle body. Moreover, the power of the engine 111 is also used to drive a hydraulic pump for a hydraulic working device 115. A hydraulic oil 122 in a hydraulic oil tank 114 is supplied to the hydraulic working device 115 such as a crane device to enable a work through the hydraulic working device 115.

The working vehicle 101 includes a radiator 116. Engine cooling water 121 is circulated between the engine 111 and the radiator 116 so that the engine 111 is cooled. Moreover, the working vehicle 101 includes an oil cooler 117 and the hydraulic oil 122 is thus cooled. A torque converter oil 123 to be used for the torque converter 112 and the transmission 113 is heat exchanged with the engine cooling water 121 by a heat exchanger 118 and is thus cooled.

In a work carried out by the hydraulic working device 115, heat of the engine 111 is radiated by the radiator 116 through the engine cooling water 121 and the heat of the hydraulic oil 122 is radiated by the oil cooler 117. On the other hand, in a running operation carried out by the running vehicle body, the heat of the engine 111 is radiated by the radiator 116 through the engine cooling water 121 and the heat of the torque converter oil 123 is exchanged with the engine cooling water 121 so that the heat is radiated by the radiator 116. The hydraulic working device 115 is not operated and a temperature of the hydraulic oil 122 is not raised. For this reason, the oil cooler 117 does not work substantially.

Regardless of heat generation from both of the engine 111 and the torque converter oil 123 in the running operation, thus, the heat is radiated from only the radiator 116 and the oil cooler 117 does not work. For this reason, there is a problem in that cooling cannot be performed efficiently. In high load running for an upward slope or the like, particularly, both of the engine 111 and the torque converter oil 123 generate heat in large amounts. In order to obtain a sufficient cooling effect, therefore, the radiator 116 is required to have a large size.

Patent Document 1 discloses the technique for cooling a torque converter oil by exchanging heat between the torque converter oil and the hydraulic oil in a fork lift truck. However, an oil cooler for cooling the hydraulic oil is not provided.

PRIOR ART DOCUMENT

Patent Document

[Patent Document 1] Japanese Laid-Open Patent Publication No. Hei 7-110058

SUMMARY OF THE INVENTION

Problem to be Solved

In consideration of the circumstances, it is an object of the present invention to provide a working vehicle capable of efficiently cooling an engine, a torque converter oil and a hydraulic oil.

Means for Solving the Problem

A working vehicle according to a first invention includes an engine, a torque converter for transmitting power of the engine to a wheel, a hydraulic working device to be operated by a hydraulic oil fed by the power of the engine, a radiator for radiating heat of engine cooling water for cooling the engine, an oil cooler for radiating heat of the hydraulic oil, and a heat exchanger for performing a heat exchange between a torque converter oil to be used for the torque converter and the hydraulic oil.

In the first invention, a working vehicle according to a second invention is characterized by a hydraulic oil circulating pump for circulating the hydraulic oil to the oil cooler in a running operation.

In the second invention, a working vehicle according to a third invention is characterized in that the hydraulic oil circulating pump is a hydraulic pump for feeding the hydraulic oil to auxiliary machines for running.

In the second invention, a working vehicle according to a fourth invention is characterized in that the hydraulic oil circulating pump is a hydraulic pump for feeding the hydraulic oil to the hydraulic working device.

In the first, second, third or fourth invention, a working vehicle according to a fifth invention is characterized in that the heat exchanger is disposed in the vicinity of the torque converter.

Effect of the Invention

According to the first invention, the torque converter oil is heat exchanged with the hydraulic oil. Therefore, the heat of the torque converter oil is radiated by the oil cooler through the hydraulic oil. For this reason, also in a running operation, the heat can be radiated by both of the radiator and the oil cooler, and the engine, the torque converter oil and the hydraulic oil can be cooled efficiently.

According to the second invention, the hydraulic oil is circulated to the oil cooler in the running operation. Therefore, it is possible to efficiently cool the torque converter oil having a temperature raised in the running operation.

According to the third invention, the hydraulic pump for feeding the hydraulic oil to the auxiliary machines for running works also in the running operation. Therefore, the hydraulic oil can be circulated to the oil cooler in the running operation. For this reason, the hydraulic pump provided originally for the auxiliary machines can be utilized and a new hydraulic pump does not need to be added.

According to the fourth invention, the hydraulic pump for feeding the hydraulic oil to the hydraulic working device is caused to work in the running operation. Therefore, the hydraulic oil can be circulated to the oil cooler in the running operation. For this reason, the hydraulic pump provided originally for the hydraulic working device can be utilized and a new hydraulic pump does not need to be added.

According to the fifth invention, the heat exchanger is disposed in the vicinity of the torque converter. Therefore, piping for guiding the torque converter oil to the heat exchanger is shortened so that a space for the piping can be reduced and the number of components can be decreased.

MODE FOR CARRYING OUT THE INVENTION

Next, an embodiment according to the present invention will be described based on the drawings.

A working vehicle according to the present invention can carry out a running operation through a running vehicle body and a work through a hydraulic working device, for example, a mobile crane, an aerial work platform, a wheel loader, a hydraulic shovel or the like. The mobile crane includes an all terrain crane, a rough terrain crane, a truck crane and the like. The mobile crane will be described below as an example. By application of the present invention to other working vehicles, the same effects can be produced.

Figure 2:
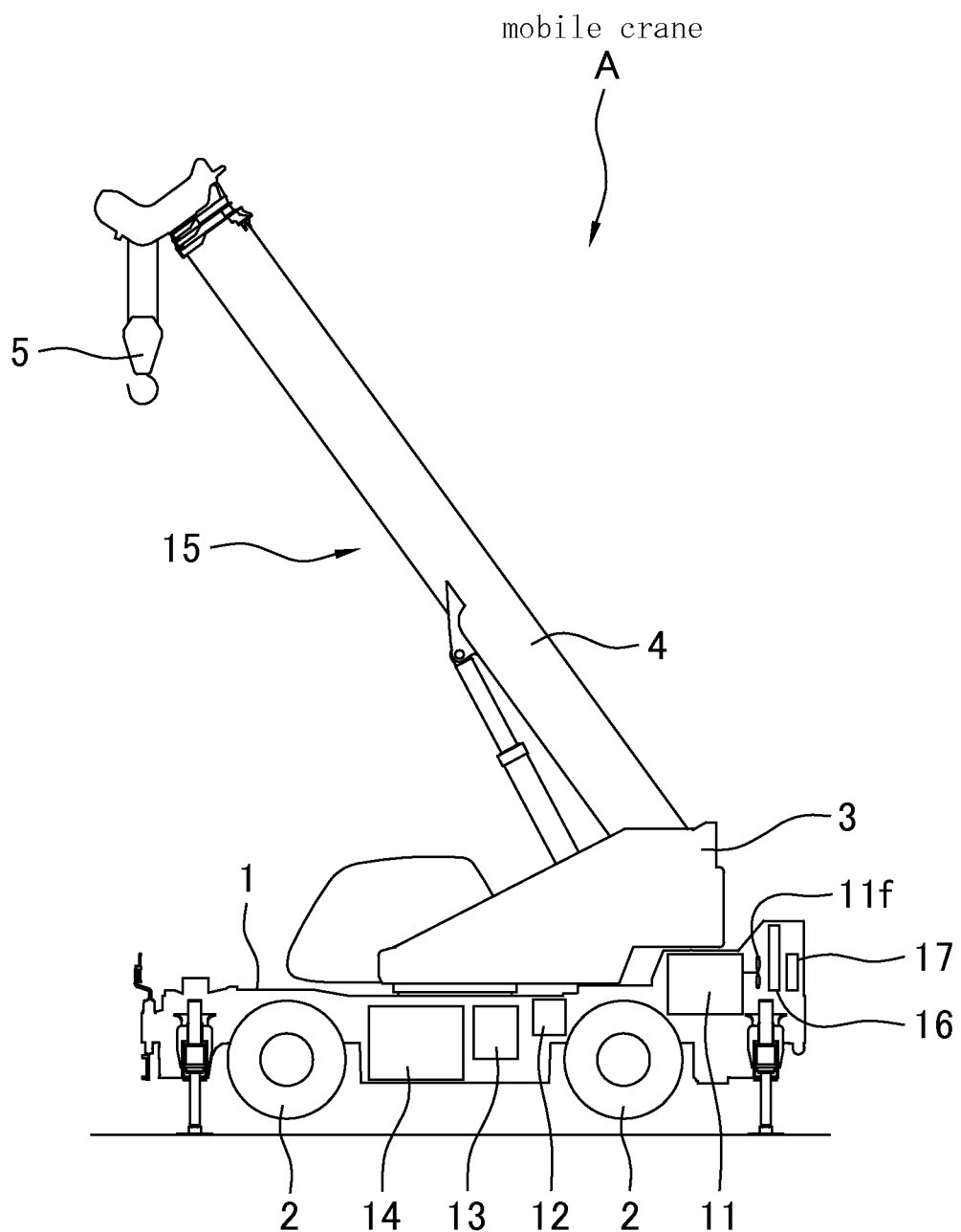
FIG. 2 is a side view showing the mobile crane.
Figure 3:
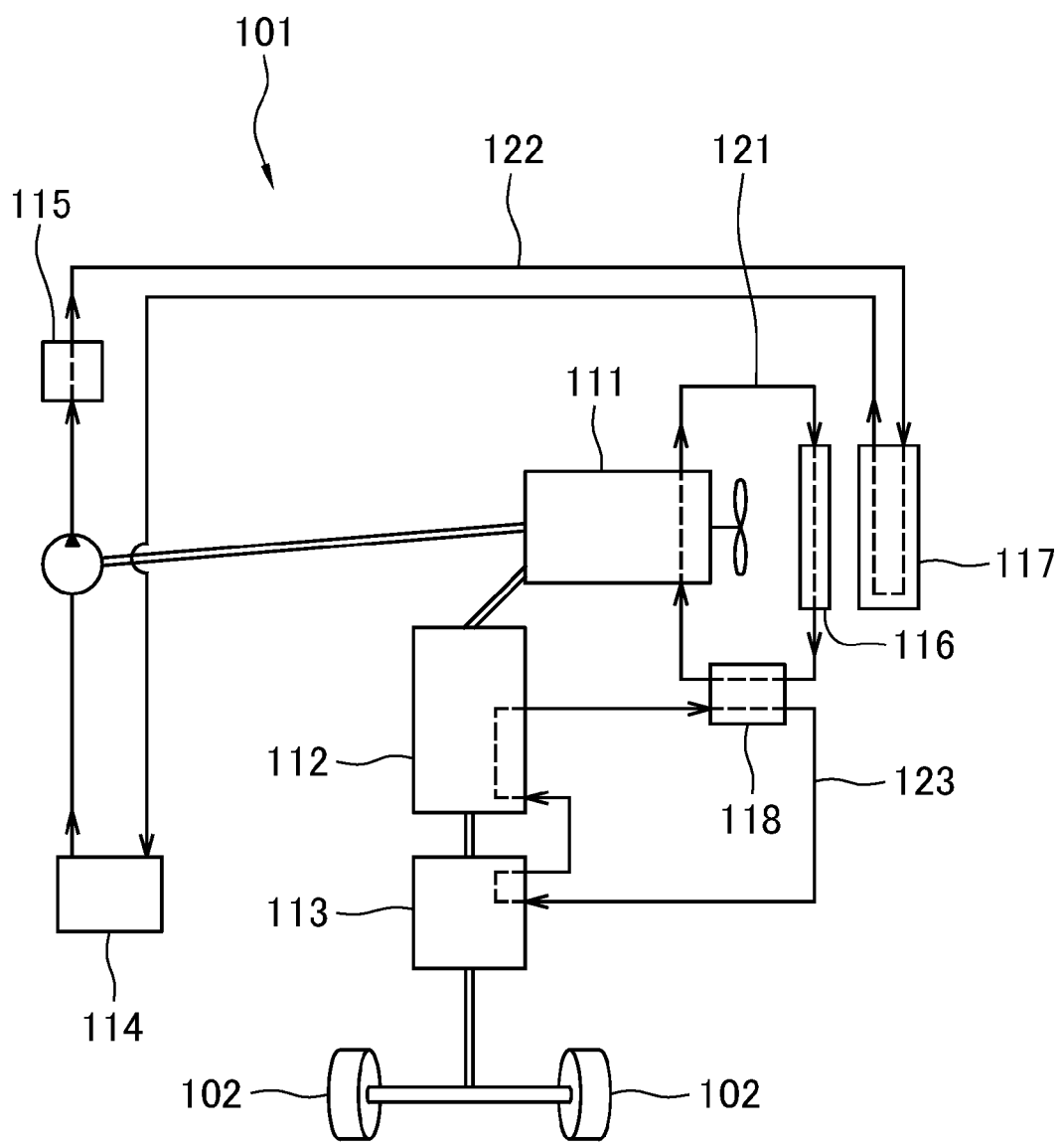
FIG. 3 is a schematic view showing a conventional working vehicle.

A basic structure of a mobile crane A according to an embodiment of the present invention will be described based on FIG. 2. The reference numeral 1 denotes a running vehicle body which includes a wheel 2 for running. The running vehicle body 1 is provided with a slewing table 3 which can be turned at 360° in a horizontal plane by a turning motor.

A boom 4 is attached to the slewing table 3 so as to be freely derricked. A base end of the boom 4 is pivotally supported on the slewing table 3 through a pin, and a derricking cylinder is attached between the boom 4 and the slewing table 3. The boom 4 is turned upward when the derricking cylinder is expanded, and the boom 4 is turned downward when the derricking cylinder is contracted. The boom 4 is configured telescopically and performs an expanding/contracting operation by an expanding/contracting cylinder.

A wire rope including a hook 5 is suspended from a tip of the boom 4. The wire rope is guided to the slewing table 3 along the boom 4 and is wound upon a winch. The winch is rotated regularly and reversely by a driving operation of a hoist motor to windup and unreel the wire rope so that the hook 5 can be lifted/lowered.

By combining the turning operation of the slewing table 3, the derricking operation of the boom 4, the expansion/contraction operation of the boom 4, and the lifting/lowering operation of the hook 5, it is possible to carry out landing and unloading in a three-dimensional space.

The turning motor for turning the slewing table 3 and the hoist motor for rotating the winch are configured from hydraulic motors. Moreover, the derricking cylinder for derricking the boom 4 and the expanding/contracting cylinder for expanding/contracting the boom 4 are configured from hydraulic cylinders. Thus, the slewing table 3, the boom 4 and the hook 5 are operated by driving a hydraulic actuator. In this specification, a device configured from the slewing table 3, the boom 4, the hook 5 and the hydraulic actuator for operating them is referred to as a crane device 15.

The crane device 15 corresponds to a "hydraulic working device" described in the claims. The hydraulic working device is operated by a hydraulic oil and differs depending on a type of a working vehicle. For example, a hydraulic working device of an aerial work platform is configured from a slewing table, a boom and a hydraulic actuator for operating them. A hydraulic working device of a wheel loader is configured from a boom, a bucket and a hydraulic actuator for operating them. A hydraulic working device of a hydraulic shovel is configured from a slewing table, an arm, a bucket and a hydraulic actuator for operating them.

The running vehicle body 1 is provided with an engine 11, a torque converter 12 for transmitting power of the engine 11 to the wheel 2, and a transmission 13. The torque converter 12 is a device for rotating a turbine blade coupled to an output shaft by kinetic energy of a fluid given by rotation of a pump blade coupled to an input shaft and circulating the fluid back to the pump blade via a guide blade, thereby converting a torque into power. The engine 11 is coupled to the input shaft and the transmission 13 is coupled to the output shaft. Moreover, the fluid to be used for the torque converter 12 is referred to as a torque converter oil.

The transmission 13 is a device including a plurality of shift gears and serving to change a rotating speed and a torque by combining the shift gears. The transmission 13 has such a type as to switch the shift gears by a fluid. In the present embodiment, the transmission 13 is configured to switch the shift gears by a torque converter oil. In other words, a common torque converter oil is used for the torque converter 12 and the transmission 13.

It is also possible to employ a structure in which separate fluids are used for the torque converter 12 and the transmission 13 or to employ a type of the transmission 13 which does not use a fluid. In these cases, the torque converter oil is used for only the torque converter 12.

The running vehicle body 1 is provided with a hydraulic oil tank 14 for storing a hydraulic oil to be used for operating the crane device 15. As will be described below, a hydraulic pump is driven by the power of the engine 11 to feed a hydraulic oil stored in the hydraulic oil tank 14, thereby operating the crane device 15.

Engine cooling water 32 for cooling the engine 11 is circulated to a water jacket provided in the engine 11, and the running vehicle body 1 is provided with a radiator 16 for radiating heat of the engine cooling water 32. Moreover, the running vehicle body 1 is provided with an air-cooled oil cooler 17 for radiating heat of a hydraulic oil 31 fed from the hydraulic oil tank 14 to the crane device 15 and having a temperature raised.

The engine 11, the radiator 16 and the oil cooler 17 are provided on a rear part of the running vehicle body 1. The engine 11 includes a fan 11f, and the radiator 16 and the oil cooler 17 are air-cooled by a blast of the fan 11f. In some cases, the radiator 16 and the oil cooler 17 are also air-cooled by a travelling wind. On the other hand, the torque converter 12, the transmission 13 and the hydraulic oil tank 14 are provided on a central part of the running vehicle body 1.

In addition, the running vehicle body 1 is provided with auxiliary machines for running, for example, a power steering device, an air conditioner and the like. Some auxiliary machines for running are operated by the hydraulic oil stored in the hydraulic oil tank 14. For example, some power steering devices are driven by a hydraulic cylinder and are operated by the hydraulic oil stored in the hydraulic oil tank 14. Moreover, some air conditioners are configured to drive a compressor by a hydraulic motor and are operated by the hydraulic oil stored in the hydraulic oil tank 14. In the present embodiment, apart of the auxiliary machines for running, for example, a power steering device, an air conditioner or the like is operated by a common hydraulic oil to the crane device 15.

Figure 1:
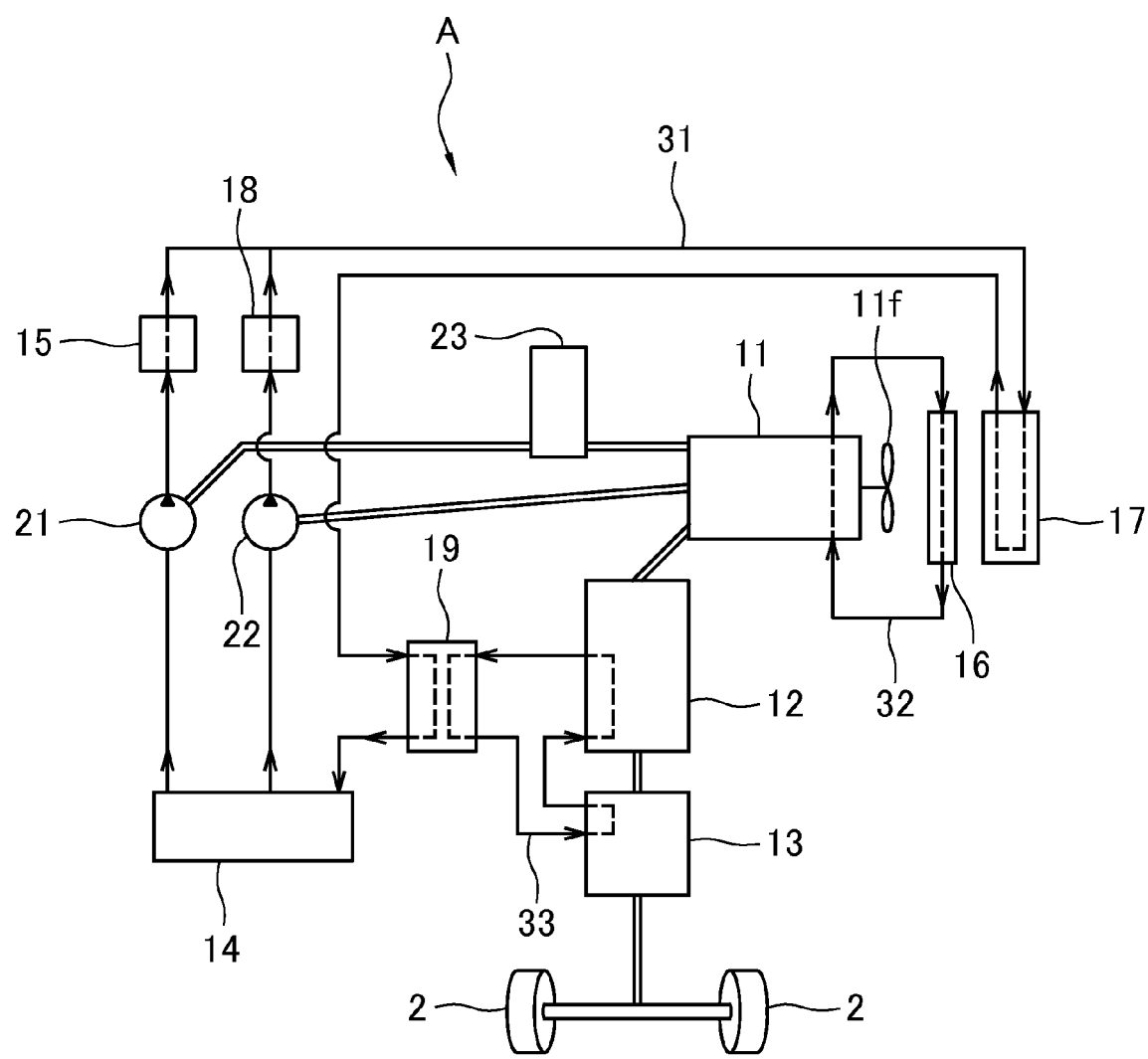
FIG. 1 is a schematic view showing a mobile crane according to an embodiment of the present invention.

As shown in FIG. 1, the power of the engine 11 is transmitted to the wheel 2 through the torque converter 12, the transmission 13 and the like. Moreover, the power of the engine 11 is transmitted to a hydraulic pump 21 for the crane device 15, and a hydraulic pump 22 for the auxiliary machines 18 for running, for example, the power steering device, the air conditioner and the like, respectively.

The engine 11 and the hydraulic pump 21 for the crane device 15 are connected through a power take-off 23. In the running operation of the running vehicle body 1, the power take-off 23 is turned OFF so that the hydraulic pump 21 is not operated. On the other hand, in the working operation of the crane device 15, the power take-off 23 is turned ON so that the hydraulic pump 21 is operated. By the operation of the hydraulic pump 21, the hydraulic oil in the hydraulic oil tank 14 is fed to operate the crane device 15. The engine 11 is always connected to the hydraulic pump 22 for the auxiliary machines 18. In both of the running and working operations, similarly, the hydraulic pump 22 is operated. By the operation of the hydraulic pump 22, the hydraulic oil in the hydraulic oil tank 14 is fed to operate the auxiliary machines 18.

The hydraulic oil 31 stored in the hydraulic oil tank 14 is fed to either of the crane device 15 and the auxiliary machines 18 through the hydraulic pumps 21 and 22, and is then joined together and guided to the oil cooler 17. Heat of the hydraulic oil 31 having a temperature raised in the crane device 15 or the auxiliary machines 18 is radiated and the hydraulic oil 31 is thus cooled by the oil cooler 17. The hydraulic oil 31 discharged from the oil cooler 17 is returned to the hydraulic oil tank 14.

The engine cooling water 32 is circulated between the engine 11 and the radiator 16. A temperature of the engine cooling water 32 cooling the engine 11 is raised, and heat of the engine cooling water 32 is radiated by the radiator 16 and the engine cooling water 32 is thus cooled and is then fed to the engine 11 again.

The mobile crane A according to the present embodiment includes a heat exchanger 19 for performing a heat exchange between a torque converter oil 33 to be used for the torque converter 12 and the transmission 13 and the hydraulic oil 31. The torque converter oil 33 having a temperature raised in the torque converter 12 and the transmission 13 is cooled by the heat exchange with the hydraulic oil 31 through the heat exchanger 19.

The mobile crane A according to the present embodiment has the structure described above. In the working operation of the crane device 15, therefore, the heat of the engine 11 is radiated by the radiator 16 through the engine cooling water 32 and the heat of the hydraulic oil 31 is radiated by the oil cooler 17. Since the torque converter 12 and the transmission 13 do not work, the temperature of the torque converter oil 33 is not raised.

In the running operation of the running vehicle body 1, moreover, the heat of the engine 11 is radiated by the radiator 16 through the engine cooling water 32 and the heat of the torque converter oil 33 is exchanged with the hydraulic oil 31 and is finally radiated by the oil cooler 17. Since the crane device 15 does not work, the temperature of the hydraulic oil 31 is not raised by the crane device 15.

Herein, the hydraulic pump 22 for feeding the hydraulic oil 31 to the auxiliary machines 18 for running works also in the running operation. For this reason, the hydraulic oil 31 can be circulated to the oil cooler 17 also in the running operation. Therefore, the heat of the hydraulic oil 31 can be radiated also in the running operation. Thus, the torque converter oil 33 having a temperature raised in the running operation can be cooled efficiently. Furthermore, the hydraulic pump 22 provided originally for the auxiliary machines 18 can be utilized so that a new hydraulic pump does not need to be added.

As described above, the torque converter oil 33 and the hydraulic oil 31 are heat exchanged. Therefore, the heat of the torque converter oil 33 is radiated by the oil cooler 17 through the hydraulic oil 31. In the running operation as well as the working operation, therefore, the heat can be radiated by both of the radiator 16 and the oil cooler 17 so that the engine 11, the torque converter oil 33 and the hydraulic oil 31 can be cooled efficiently.

In addition, generally, the hydraulic oil 31 has a larger amount and a larger heat capacity than the torque converter oil 33. The heat of the torque converter oil 33 is transferred to the hydraulic oil 31. Therefore, the large heat capacity of the hydraulic oil 31 can be utilized so that an effect for cooling the torque converter oil 33 can be enhanced.

Moreover, the torque converter oil 33 has such a property as to instantaneously generate heat when a load is applied to the torque converter 12 or the transmission 13. By transferring the heat of the torque converter oil 33 to the hydraulic oil 31 having the large heat capacity, however, it is possible to level a rise in the temperature of the hydraulic oil 31. As a result, the temperature of the hydraulic oil 31 can be prevented from being raised suddenly, and the oil cooler 17 does not need to have a large size.

Although the heat exchanger 19 may be provided in any place of a path for the hydraulic oil 31, it is preferably provided in an oil path returned from the oil cooler 17 to the hydraulic oil tank 14 or in the hydraulic oil tank 14. Consequently, the hydraulic oil 31 cooled by the oil cooler 17 can be heat exchanged with the torque converter oil 33. Therefore, the torque converter oil 33 can be cooled effectively.

Moreover, it is preferable that the heat exchanger 19 should be disposed in the vicinity of the torque converter 12 and the transmission 13. Consequently, piping for guiding the torque converter oil 33 to the heat exchanger 19 is shortened so that a space for the piping can be reduced and the number of components can be decreased. In particular, a space has no room in the vicinity of the engine 11 in the rear part of the running vehicle body 1. For this reason, it is preferable that the heat exchanger 19 should be disposed in the central part of the running vehicle body 1 provided with the torque converter 12, the transmission 13 and the hydraulic oil tank 14. Moreover, the heat can be treated near a heat source. Therefore, it is possible to lessen an influence on other devices due to the heat of the torque converter oil 33.

Other Embodiments

It is also possible to employ a structure in which the auxiliary machines 18 for running, for example, a power steering device, an air conditioner and the like are operated by a separate hydraulic oil from the crane device 15 or a structure in which the hydraulic oil is not used. In this case, the hydraulic oil cannot be circulated to the oil cooler 17 by the hydraulic pump 22 for the auxiliary machines 18 in the running operation. By operating the hydraulic pump 21 for feeding the hydraulic oil to the crane device 15 in the running operation, therefore, it is also possible to circulate the hydraulic oil to the oil cooler 17 also in the running operation. Consequently, the hydraulic pump 21 provided originally for the crane device 15 can be utilized so that a new hydraulic pump does not need to be added. In this case, it is preferable to employ a structure in which the hydraulic oil is not fed to the crane device 15 but is circulated to the oil cooler 17 in the running operation by using a directional control valve or the like.

Moreover, a hydraulic oil circulating pump for circulating the hydraulic oil to the oil cooler 17 in the running operation may be provided in addition to the hydraulic pumps 21 and 22. Consequently, the hydraulic oil can be circulated to the oil cooler 17 in the running operation. Therefore, it is possible to efficiently cool the torque converter oil 33 having a temperature raised in the running operation.

EXPLANATION OF DESIGNATION

1 running vehicle body
2 wheel
3 slewing table
4 boom
5 hook
11 engine
12 torque converter
13 transmission
14 hydraulic oil tank
15 crane device
16 radiator
17 oil cooler
18 auxiliary machines
19 heat exchanger
21 hydraulic pump
22 hydraulic pump
23 power take-off
31 hydraulic oil
32 engine cooling water
33 torque converter oil

The invention claimed is:

1. A mobile crane capable of carrying out a running operation and a working operation, the mobile crane comprising:
   an engine;
   a torque converter, which transmits power of the engine to a wheel;
   a hydraulic working device, which is operated by a hydraulic oil fed by the power of the engine;
   a radiator, which radiates heat of engine cooling water for cooling the engine;
   an oil cooler, which radiates heat of the hydraulic oil;
   a heat exchanger, which performs a heat exchange between a torque converter oil to be used for the torque converter and the hydraulic oil;
   an auxiliary machine capable of being used in the working operation and the running operation;
   a first oil path, which is connected to an oil tank and passes through the auxiliary machine so that the hydraulic oil from the oil tank is fed to the auxiliary machine;
   a second oil path, which is connected to the oil tank and passes through the hydraulic working device, so that the hydraulic oil from the oil tank is fed to the hydraulic working device;
   a hydraulic oil path, which is connected to the oil tank through the oil cooler and the heat exchanger;
   wherein the first oil path and the second oil path are connected to the hydraulic oil path so that the hydraulic oil from the first oil path and that of the second oil path join together;
   a first hydraulic pump, which is provided between the oil tank and the auxiliary machine, and which is connected to and driven by the engine to feed the hydraulic oil from the oil tank to the auxiliary machine so that the hydraulic oil is circulated to the oil cooler and the heat exchanger through the first oil path and the hydraulic oil path;
   a second hydraulic pump, which is provided between the oil tank and the hydraulic working device, which is connected to and driven by the engine to feed the hydraulic oil from the oil tank to the hydraulic working device so that the hydraulic oil is circulated to the oil cooler and the heat exchanger through the second oil path and the hydraulic oil path; and
   a power take-off, which is provided between the engine and the second hydraulic pump and operates the second hydraulic pump only in the working operation, so that the hydraulic oil is fed from the oil tank to the hydraulic working device only in the working operation by the power take-off and the second hydraulic pump.

2. The mobile crane according to claim 1, wherein the heat exchanger is disposed in the vicinity of the torque converter.

* * * * *